United States Patent [19]
Westman

[11] Patent Number: 5,176,413
[45] Date of Patent: Jan. 5, 1993

[54] ANCHORING MEANS FOR PIPES WITH RHOMBOID-SHAPED GRIP RING

[76] Inventor: Stig Westman, Räfsvägen 22, S-740 40 Heby, Sweden

[21] Appl. No.: 689,787
[22] PCT Filed: Nov. 30, 1988
[86] PCT No.: PCT/SE89/00695
§ 371 Date: May 21, 1991
§ 102(e) Date: May 21, 1991
[87] PCT Pub. No.: WO90/06468
PCT Pub. Date: Jun. 14, 1990

[30] Foreign Application Priority Data

Nov. 30, 1988 [SE] Sweden .................. 8804345

[51] Int. Cl.⁵ .................................. F16L 21/00
[52] U.S. Cl. .................... 285/321; 285/340; 285/276; 285/917; 277/167.5
[58] Field of Search ............. 285/321, 340, 276, 917; 277/167.5, 236, 237 A, 216

[56] References Cited

U.S. PATENT DOCUMENTS

| | | |
|---|---|---|
| 1,821,866 | 9/1931 | Wilson .............. 277/167.5 |
| 3,381,983 | 8/1965 | Hanes ................ 285/321 |
| 3,389,923 | 11/1967 | Love, Jr. et al. ...... 285/321 |
| 3,776,576 | 12/1973 | Keyser ............ 285/321 X |
| 4,168,237 | 9/1979 | Pickett et al. ....... 285/343 X |

FOREIGN PATENT DOCUMENTS 32210094 12/1982 Fed. Rep. of Germany .
331008 12/1970 Sweden .
86015377 10/1987 Sweden .
452358 11/1987 Sweden .
2156467 10/1985 United Kingdom .

*Primary Examiner*—Randolph A. Reese
*Assistant Examiner*—Timothy Aberle
*Attorney, Agent, or Firm*—Young & Thompson

[57] ABSTRACT

The present invention relates to a union device for pipe joints, where the joint is within the wall thickness of the pipes being joined, and includes a female part (1) and a male part (2), which in substantially complemental implementation permits the male part (2) to be inserted into the female part (1). In the outer and inner peripheral surfaces of the male and female parts there are grooves (5,11) extending around the periphery such as to form a cavity for a locking ring when the joint has been assembled. In this cavity there is a locking ring having a rhomboid form in cross section with cut away portions at the long sides of the two diametrically opposite acute corners and being of a material which retains its shape with a given resiliency. This locking ring is provided with a through slit or with one or more shorter slits from its large end towards its small end. The locking ring is normally placed in the groove (5) in the female part (1) with the large end facing axially outwards, such that on inserting the male part (2) into the female part (1) the male part (2) causes the locking ring resiliently to move away, such as to regain its original shape once again when the groove (11) in the male part (2) comes opposite the locking ring.

1 Claim, 2 Drawing Sheets

ANCHORING MEANS FOR PIPES WITH RHOMBOID-SHAPED GRIP RING

BACKGROUND OF THE INVENTION

The present invention relates to union devices for pipe joints and more specifically to such a union, which keeps the pipes securely together on being joined, and where the union can only be disconnected using special measures.

When pipes are laid to form an entire pipeline, there is generally the desire of fixing the pipes to each other so that they will not be separated, e.g. should there be settlements in the pipeline trench. When pipes are inserted in existing pipelines, it may be necessary on many occasions to pull the pipes through these pipelines, and in such a case it is necessary that the joints are securely made. In certain cases, there is a requirement that the joints shall withstand a tensile load of up to 2000 kp.

Particularly in lining pipelines, there must not be any parts projecting inwards or outwards of the pipes at the joints, since in both cases the maximum diameter of the relining pipeline will be restricted. Both the joint and the union must therefore lie within the normal wall thickness of the lining pipe.

SUMMARY OF THE INVENTION

The present invention has the object of achieving such a pipe joint, which solves the problems mentioned above in a desired manner. This object is achieved by a union device of the kind disclosed in the claims, and what particularly characterizes the invention will also be apparent from the claims.

BRIEF DESCRIPTION OF THE DRAWINGS

The invention will now be described in more detail and in connection with the accompanying drawings, where.

DESCRIPTION OF THE PREFERRED EMBODIMENTS

Figure 2:
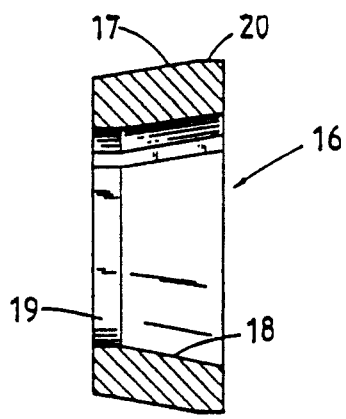
FIG. 2 is an enlarged cross section through the locking ring of FIG. 1.
Figure 3:
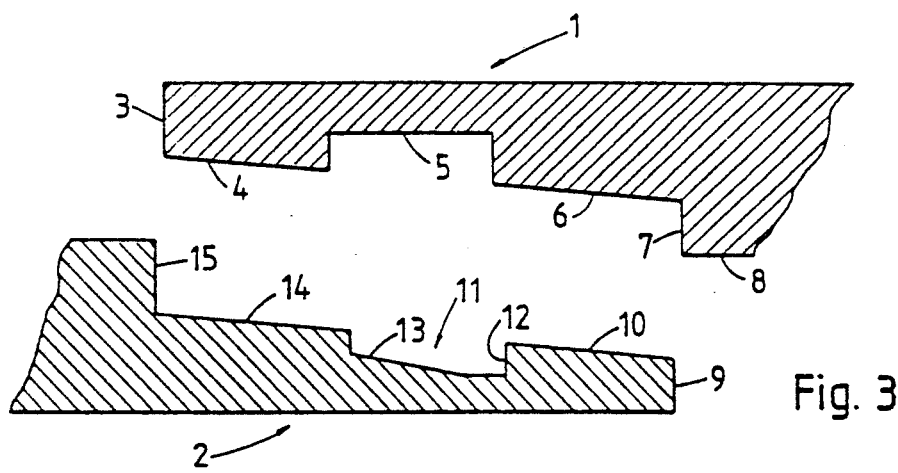
FIG. 3 is a fragmentary section through the male and female part of a pipe joint intended for the union device in accordance with the invention.
Figure 4:
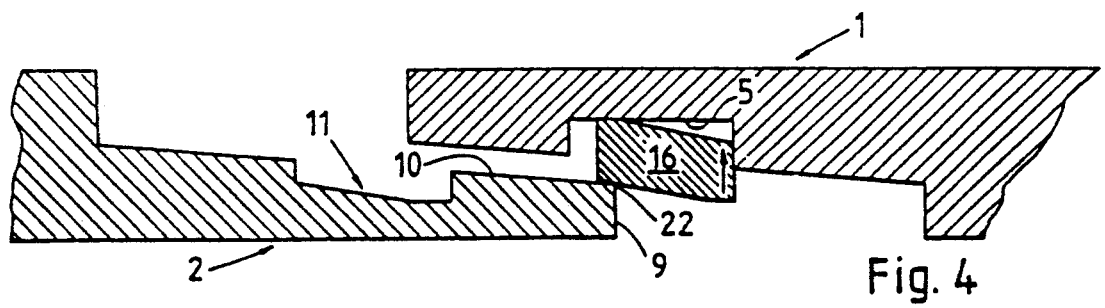
FIG. 4 illustrates a male and a female part at the beginning of fitting, with a locking ring placed in the female part.

In FIG. 2 there is shown a female part 1 and a male part 2 in fragmentary schematic cross section. From its outer radial end surface 3, the female part 1 has a first part 4 tapering to a decreased diameter inwards, a second part 5 in the form of a circular groove with a bottom parallel to the outside of the female part 1, and a third part 6 which is similarly tapered with reducing diameter inwards to terminate at a radially inwardly directed wall 7, in turn terminating at the inside 8 of the pipe.

The male part 2 has to a large extent a configuration complemental to the female part 1, so that it can be inserted in the latter. From its radially outward end surface 9 the male part 2 has a first part 10 complemental to the part 6 in the female part 1, a second part 11 which is an outwardly directed circular groove intended to be directly opposite the groove 5 in the female part, but having a first straight part 12 and a second tapering part 13, the male part also having a third part 14 complemental to the part 4 of the female part 1. The grooves 5 and 11 are intended to accommodate a locking ring, while the part 14 terminates in a radially outwardly directed end wall 15. The end walls 7 and 15 mate up with the end surfaces 9 and 13 respectively.

Although the male and female parts 2, 1 described here having tapering surfaces or parts, it will be understood by one skilled in the art that these can also have other configurations such as curved, cylindrical etc. without departing from the inventive concept.

Figure 1:
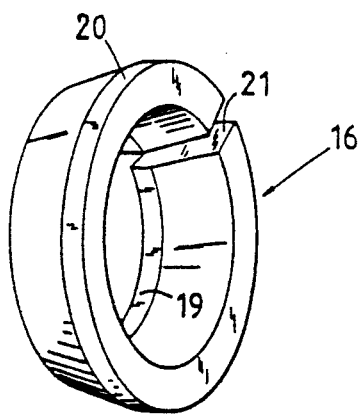
FIG. 1 is a perspective view of a locking ring used in the union device in accordance with the invention.

The locking ring itself is illustrated in FIGS. 1 and 2 and is to be accommodated in the grooves 5 and 11 when the union is made in the pipe joint. As is most easily seen in FIG. 2, the locking ring 16 is conical with an outer surface 17 and an inner surface 18, these two surfaces being substantially parallel. At the narrow end of the inner surface 18 there is a short cylindrical part 19 and at the wide end of the outer surface 17 there is also a short cylindrical part 20. When viewed in cross section as depicted in the drawings, the locking ring 16 is in the shape of a rhomboid having cut-away portions at the long sides of the two diametrically opposite acute corners of the rhomboid. The ring 16 is suitably made from a plastics material and is comparatively rigid but with some resiliency. The ring 16 is also slit at 21 to facilitate its contraction when fitting the male and female parts into each other.

The locking ring 16 is fitted beforehand into the groove 5 in the female part 1, where it is well protected from damage during storage, transport and fitting of the pipes.

Figure 5:
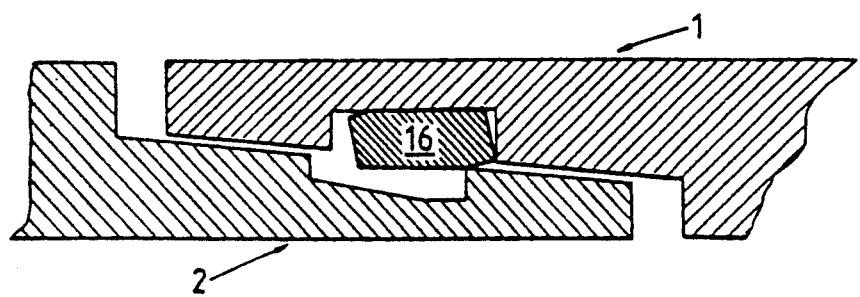
FIGS. 5–7 show how the union is achieved during the fitting process.
Figure 6:
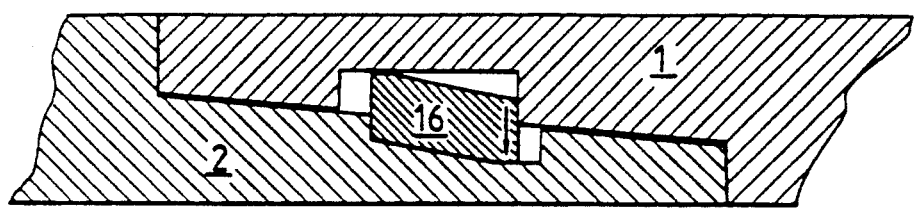
Figure 7:
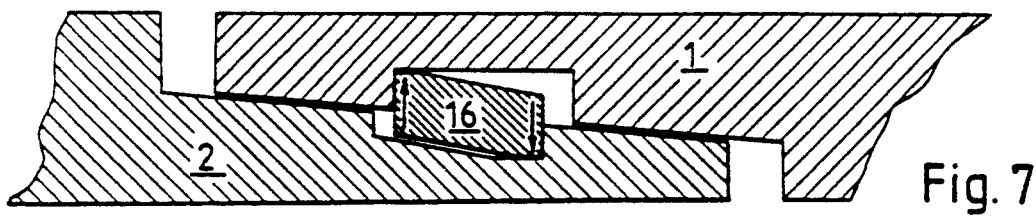

FIGS. 4–7 illustrate the fitting sequence. In FIG. 1, the male part 2 has begun to enter the female part 1 and has come as far as the locking ring 16. It is important here that the annular edge 22 forming the junction between parts 9 and 10 is within a diameter range permitting its entry into the conical opening of the ring 16. Continued insertion of the male part 2 into the female part 1 results in that the locking ring 16 is pushed into the groove 5, as illustrated in FIG. 5, to subsequently spring backwards again into the groove 11, as illustrated by FIG. 6. Any attempt to pull the male and female parts apart is then prevented by the locking ring 16, as will be seen from FIG. 7.

The illustrated joint is comparatively tight with respect to penetrating contaminants. To be liquid-tight, however at least one flexible sealing ring must be inserted between the parts 6 and 10 and preferably also between the parts 4 and 14.

The female part 1 is suitably provided with a through opening into the groove 5. A tool can then be inserted from the outside into such an opening for pulling out the locking ring 16 if a finished pipe joint must be opened.

The invention has been described here in connection with pipes with a circular cross section. However, with the aid of simple methods it can be used for pipes having other cross sections, e.g. for pipes with a quadratic cross section. The male and female parts may then have the illustrated configuration, but the locking ring is provided with cuts at its corners. For removing such a locking ring when it has formed the union in the pipe joint, there should be an opening into the groove of the union device at each corner of the female part, so that the ring can be cut and pulled out. Such a square ring does not need to have any slit.

Instead of a slit 21, as illustrated in FIG. 1, the locking ring 16 may have one or more slits from its large end, but these are then not through slits, and they stop at a distance from its small end.

As will be seen, this invention solves the problems posed in the introduction in a simple and secure way. Many modifications are conceivable to one skilled in this field, but these are intended to be within the scope of the accompanying claims.

I claim:

1. A self-locking device for securing cylindrical pipes having substantially constant inner and outer diameters, comprising:

a first pipe having first means at one end thereof for connecting said one end of said first pipe to one end of a second pipe, said first means including a first groove internal of said first pipe;

a second pipe having second means at one end thereof for connecting said one end of said second pipe to said one end of said first pipe, said second means including a second groove external of said second pipe and disposed axially of said second pipe so that said first groove and said second groove are located opposite each other when said first end of said first pipe is connected to said first end of said second pipe; and third means disposed within said first groove and said second groove when said first pipe is connected to said second pipe for locking said first pipe to said second pipe, said third means including a locking ring of permanent shape and resilient material the cross section of which is in the shape of a rhomboid, said rhomboid having a pair of long sides and a pair of relatively short sides, and having cut-away portions at the long sides of the two diametrically opposite acute corners of said rhomboid.

* * * * *